Figure 1:
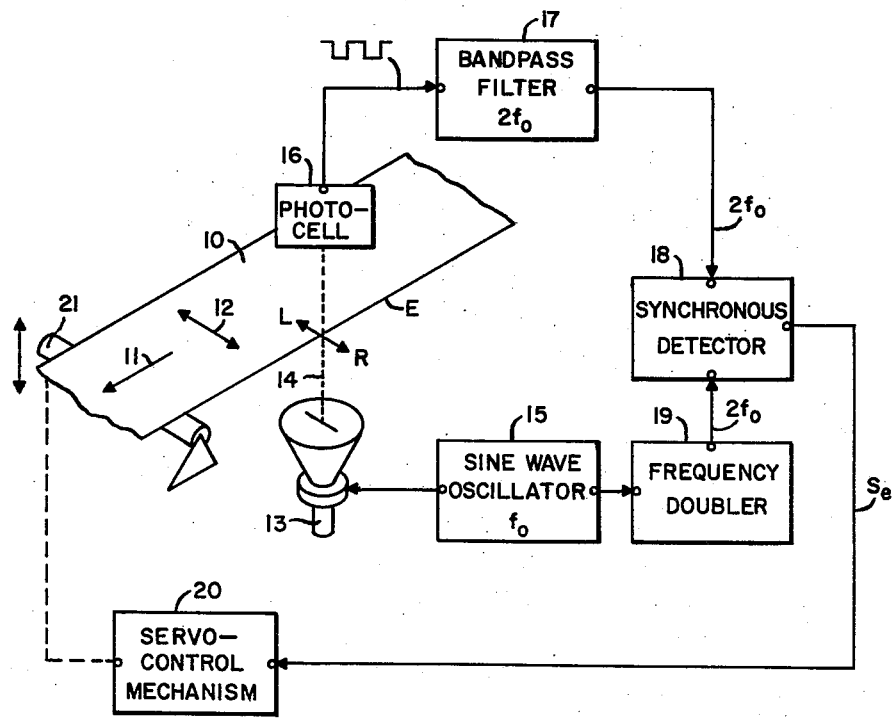

United States Patent Office 3,108,727
Patented Oct. 29, 1963

3,108,727
POSITION-SENSING APPARATUS
Richard J. Farber, New Hyde Park, N.Y., assignor to Hazeltine Research, Inc., a corporation of Illinois
Filed Aug. 21, 1961, Ser. No. 132,950
12 Claims. (Cl. 226—20)

This invention relates to position-sensing apparatus useful in determining the position of stock and, in particular, for providing an indication of when such stock is out of its correct position. It is particularly useful in maintaining alignment of thin stock, such as paper, as it is caused to move along a given axis or direction as, for example, in the case of printing presses; and it will, therefore be described in that connection.

It is an object of the present invention to provide position-sensing apparatus which will give, by means of an electrical error signal, an indication of incorrect positioning of the stock.

It is also an object of the present invention to provide position-sensing apparatus for producing the aforementioned error signal whereby the error signal gives an indication of both the extent to which said stock is out of its correct position and the direction in which it is incorrectly positioned.

In accordance with the invention, position-sensing apparatus for determining the position of stock comprises means for directing energy across an edge of the stock, a portion of the energy being incident on the stock and another portion thereof extending beyond the edge. The apparatus also comprises means responsive to at least one of the aforesaid energy portions for producing therefrom a signal having a predetermined harmonic component only when the stock is out of position so that the presence of the harmonic component may be used to indicate incorrect positioning of the stock.

For a better understanding of the present invention, together with other and further objects thereof, reference is had to the following description, taken in connection with the accompanying drawing, and its scope will be pointed out in the appended claims.

Figure 2:
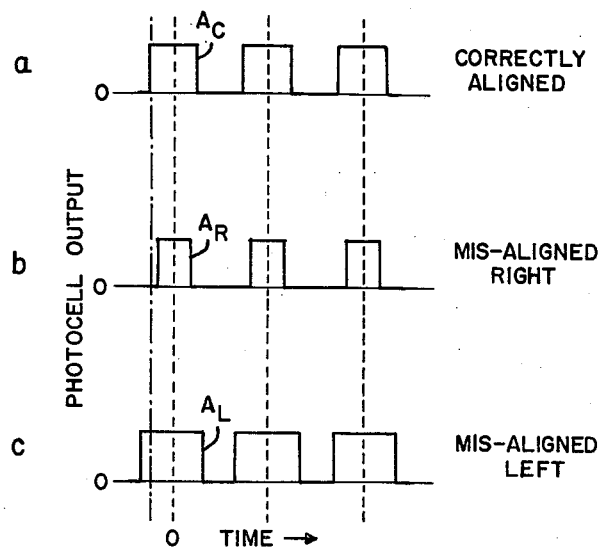
Figure 3:
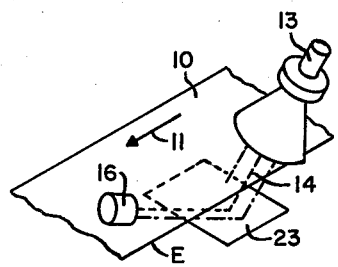

Referring to the drawing:

FIG. 1 is a partially schematic and partially diagrammatic representation of an embodiment of the present invention;

FIGS. 2a, 2b, and 2c are signal diagrams used in explaining the operation of the invention, and FIG. 3 is an illustration of a modified form of the invention.

Description of FIG. 1

There is shown in FIG. 1 position-sensing apparatus for determining the position of stock. More specifically, there is shown a particular embodiment of the invention comprising alignment-sensing apparatus for determining when paper stock 10, moving along an axis represented by arrow 11, is out of alignment along a transverse axis represented by the bidirectional arrow 12. The apparatus includes means for directing energy across an edge E of paper stock 10. This means in FIG. 1 includes cathode-ray tube 13 and its associated energizing voltage source (not shown), both of conventional construction. It further includes sine wave oscillator 15 connected to the deflection windings on cathode-ray tube 13 to produce a scanning light beam 14 which scans back and forth across edge E in such a manner that a portion of the scanning by light beam 14 is incident on paper stock 10, while another portion thereof occurs beyond edge E. For example, the scanning may be orthogonal to edge E along the bidirectional arrow marked L—R (representing left and right, respectively) and the scanning may be centered on edge E when paper stock 10 is correctly aligned so that the time the light beam 14 is visible during the over-scan portion is equal to the time it is incident on stock 10. In the embodiment of FIG. 1, paper stock 10 is preferably opaque, so that the portion of the scanned light beam 14 that is incident thereon is completely blocked by the paper stock. On the other hand, if the stock 10 is not opaque, it should be sufficiently dense so that there is a detectable difference in the intensity of beam 14 between the time it is visible through stock 10 and the time it is directly visible during the over-scan portion beyond edge E.

The apparatus also includes means including photocell 16, responsive to at least a portion of the directed energy, for producing therefrom a signal having a predetermined harmonic component only when paper stock 10 is out of position so that the presence of the harmonic component may be used to indicate incorrect positioning of the stock. In the case where paper stock 10 is completely opaque, photocell 16 is responsive to the over-scanned portion of scanned light beam 14 to produce, at the output of photocell 16, a square-wave electrical signal wherein even harmonic frequency components will occur only when the square-wave signal is symmetrical, which, of course, would occur only when the paper stock 10 is misaligned to the left or right, thereby exposing scanned light beam 14 to photocell 16 for a greater or lesser time. The output of photocell 16 is coupled to bandpass filter 17 to filter out a desired even harmonic, for example, the second harmonic ($2f_0$) of the scan frequency ($f_0$) generated in oscillator 15.

In addition, a system embodying the sensing apparatus of the invention may be provided with means including synchronous detector 18, responsive to the harmonic component at the output of filter 17, for deriving therefrom an error signal $S_e$ indicative of the direction and extent of misalignment of paper stock 10. A reference signal for use in detector 18 may be derived from oscillator 15 by means of a conventional frequency doubler 19. Detector 18 is of conventional construction to produce the aforementioned error signal $S_e$ when the second harmonic component $2f_0$ is present at the output of filter 17; the error signal $S_e$ being positive or negative, depending on the phase of the harmonic component and, consequently, on the direction of misalignment of paper stock 10. It will be appreciated that, if desired, other even harmonic components may be used, the second harmonic being described merely by way of example.

The system is also provided with means including servo-control mechanism 20, responsive to the error signal $S_e$, for repositioning paper stock 10 along the transverse axis 12, whereby correct transverse alignment is maintained. Mechanism 20 may be of conventional electronic or hydraulic construction and is coupled to one end of paper roller 21. Roller 21 is pivoted at the end nearest edge E of paper stock 10 and is movable at the other end connected to mechanism 20. In this way, mechanism 20 controls the positioning of paper stock 10 in a well-known manner by raising or lowering the free end of roller 21, thereby causing the paper to shift to the right or left as it passes over the roller.

In operation, as paper stock 10 moves over roller 21 in the direction of arrow 11, it may be shifted back and forth over roller 21 in the direction of arrow 12. Assuming that paper stock 10 is initially correctly aligned, then, as light beam 14 scans back and forth across edge E, it is blocked half the time by stock 10 and is "visible" to photocell 16 the other half the time. This produces a symmetrical square-wave electrical signal $A_c$, shown in FIG. 2a, at the output of photocell 16. It can be demonstrated by means of Fourier analysis that there are no even harmonic frequency components in a symmetrical square-wave signal; and, therefore, at this time there is no signal output from filter 17 and, thus, there is no error signal $S_e$ developed at the output of detector 18.

Assuming now that paper stock 10 is misaligned to the right, in the direction of the fixed end of roller 21, the scanned light beam 14 now is blocked by paper stock 10 a greater portion of the time, and therefore a signal $A_R$ in FIG. 2b comprising a series of narrow pulses is produced at the output of photocell 16. These narrow pulses effectively comprise an asymmetrical square-wave signal in which the even harmonic components occur. Similarly, if the paper shifts to the left, in the direction of the movable end of roller 21, a signal $A_L$ in FIG. 2c comprising a series of wide pulses appears at the output of photocell 16, since now the scanned light is blocked for a lesser proportion of the scan period. These wide pulses also comprise effectively an asymmetrical square-wave signal in which the even harmonics appear. In either case, the second harmonic component is translated through filter 17 and applied to the input of detector 18. In detector 18, this second harmonic component is beat against the reference signal from frequency doubler 19 in a conventional manner to produce a D.-C. output signal which is the error signal $S_e$.

It can be shown, by means of Fourier analysis, that the second harmonic component in the asymmetrical signal produced by photocell 16 will have a negative relative phase when the pulses are narrow and a positive relative phase when the pulses are wide. Thus, error signal $S_e$ has an amplitude corresponding to the amplitude of the second harmonic component from filter 17 which represents the magnitude or extent to which paper stock 10 is misaligned, and it also has a relative polarity, determined by the aforementioned phase characteristic, which determines the direction of misalignment. Servomechanism 20 then responds to the error signal in a conventional manner to move the end of roller 21 up or down, as necessary, to cause paper stock 10 to shift back to its correct alignment position.

It will be appreciated that various modifications of the apparatus may be employed without departing from the invention. For example, FIG. 3 illustrates an arrangement whereby both the light beam scanning device 13 and the photocell 16 are located on the same side of the stock 10 being checked. A mirror 23, located on the opposite side of stock 10, reflects the over-scanned portion of beam 14 and the operation of the FIG. 3 apparatus is otherwise the same as that of FIG. 1. The FIG. 3 apparatus is advantageous where stock 10 may be relatively transparent, since the beam incident on stock 10 must pass through the stock twice before reaching photocell 16 and is, therefore, doubly attenuated, thereby making derivation of the square-wave easier in the case of transparent stock than with the arrangement of FIG. 1.

Referring again to FIG. 1, the cathode-ray tube 13 may be replaced by a scanning supersonic radiating transducer and photocell 16 by a pickup transducer responsive to the supersonic waves to produce the square-wave signal much the same as wireless remote control systems in television receivers. Thus, it is not necessary that light beams be used.

Furthermore, it is immaterial whether the energy source or the photocell is caused to scan. For example, a fixed elongated light source may be used in connection with a reciprocally scanning photocell.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Position-sensing apparatus for determining the position of stock, comprising: means for directing energy across an edge of said stock, a portion of said energy being incident on said stock and another portion thereof extending beyond the edge; means responsive to at least one of said energy portions for producing therefrom a signal having a predetermined harmonic component only when the stock is out of position; and means responsive to said harmonic component for deriving therefrom an error signal which is indicative of the incorrect positioning of said stock and which may be used to effect the correct positioning of said stock.

2. Position-sensing apparatus for determining the position of stock, comprising: means for scanning a beam of energy across an edge of said stock, said scanning being centered with respect to said edge when said stock is correctly positioned so that a first portion of said energy is incident on said stock and a second portion thereof, equal to said first portion, extends beyond the edge; means responsive to at least one of said energy portions for producing therefrom a signal having a predetermined harmonic component only when the stock is out of position; and means responsive to said harmonic component for deriving therefrom an error signal which is indicative of the incorrect positioning of said stock and which may be used to effect the correct positioning of said stock.

3. Position-sensing apparatus for determining when a piece of stock is out of position, comprising: means for scanning a beam of light across an edge of said stock, said scanning being centered with respect to said edge when said stock is correctly positioned so that half of said scanned light beam over-scans the edge of said stock, more or less over-scan occurring when said stock is not correctly positioned; means responsive to the over-scanned light beam for producing therefrom a signal having a predetermined harmonic component only when the stock is out of position; and means responsive to said harmonic component for deriving therefrom an error signal which is indicative of the incorrect positioning of said stock and which may be used to effect the correct positioning of said stock.

4. Position-sensing apparatus for determining the position of stock in a given plane, comprising: means oriented on one side of said plane for scanning a beam of light across an edge of said stock, a portion of said energy being incident on said stock and another portion thereof extending along said plane beyond the edge; means oriented on the opposite side of said plane and responsive to at least one of said energy portions for producing therefrom a signal having a predetermined harmonic component only when the stock is out of position; and means responsive to said harmonic component for deriving therefrom an error signal which is indicative of the incorrect positioning of said stock and which may be used to effect the correct positioning of said stock.

5. Position-sensing apparatus for determining the position of stock in a given plane, comprising: means oriented on one side of said plane for scanning a beam of light across an edge of said stock, a portion of said energy being incident on said stock and another portion thereof extending along said plane beyond the edge; means oriented on the same side of said plane and responsive to at least one of said energy portions for producing therefrom a signal having a predetermined harmonic component only when the stock is out of position; and means responsive to said harmonic component for deriving therefrom an error signal which is indicative of the incorrect positioning of said stock and which may be used to effect the correct positioning of said stock.

6. Alignment-sensing apparatus for determining when stock moving along one axis is out of alignment along a transverse axis, comprising: means for directing energy across an edge of said stock, said edge being one which is effectively parallel to said one axis of movement, a portion of said energy being incident on said stock and another portion thereof extending beyond the edge of said stock; means responsive to at least one of said portions of energy for producing therefrom a signal having a predetermined harmonic component only when the stock is out of alignment; and means responsive to said harmonic component for deriving therefrom an error signal which is indicative of the misalignment of said stock and which may be used to effect a correction of the misalignment of said stock along said transverse axis.

7. Alignment-sensing apparatus for determining when stock moving along one axis is out of alignment along a transverse axis, comprising: means for directing energy across an edge of said stock, said edge being one which is effectively parallel to said one axis of movement, a portion of said energy being incident on said stock and another portion thereof extending beyond the edge of said stock; means including an energy-responsive device scanning a path that brings said device into responsive engagement, along a restricted length of said path, with at least one of said portions of directed energy for producing therefrom an electrical signal having a predetermined harmonic component only when the stock is out of alignment; and means responsive to said harmonic component for deriving therefrom an error signal which is indicative of the misalignment of said stock and which may be used to effect a correction of the misalignment of said stock along said transverse axis.

8. Alignment-sensing apparatus for determining when stock moving along one axis is out of alignment along a transverse axis, comprising: means for directing energy across an edge of said stock, said edge being one which is effectively parallel to said one axis of movement, a portion of said energy being incident on said stock and another portion thereof extending beyond the edge of said stock; means responsive to at least one of said portions of energy for producing therefrom a symmetrical electrical signal having a second harmonic component only when the stock is out of alignment; and means responsive to said harmonic component for deriving therefrom an error signal which is indicative of the misalignment of said stock and which may be used to effect a correction of the misalignment of said stock along said transverse axis.

9. Alignment-sensing apparatus for determining when stock moving along one axis is out of alignment along a transverse axis, comprising: means for directing energy across an edge of the stock, said edge being one which is effectively parallel to said one axis of movement, a portion of said energy being incident on the stock and another portion thereof extending beyond the edge of the stock; means responsive to at least one of said portions of energy for producing therefrom a signal having a predetermined harmonic component only when the stock is out of alignment, the amplitude of said component being indicative of the extent of misalignment, and the phase of said component being indicative of the direction of misalignment; and means including a detector circuit responsive to said harmonic component for deriving therefrom an error signal indicative of the direction and extent of misalignment of the stock.

10. An alignment-correcting system for maintaining stock moving along a given axis in correct alignment along a transverse axis, comprising: means for directing energy across an edge of the stock, said edge being one which is effectively parallel to said given axis of movement, a portion of said energy being incident on the stock and another portion thereof extending beyond the edge of the stock; means responsive to at least one of said portions of energy for producing therefrom a signal having a predetermined harmonic component only when the stock is out of alignment; means for deriving an error signal from said harmonic component; and means responsive to said error signal for repositioning the stock along said transverse axis, whereby correct transverse alignment is maintained.

11. An alignment-correcting system for maintaining stock moving along a given axis in correct alignment along a transverse axis, comprising: means for directing energy across an edge of the stock, said edge being one which is effectively parallel to said given axis of movement, a portion of said energy being incident on the stock and another portion thereof extending beyond the edge of the stock; means responsive to at least one of said portions of energy for producing therefrom a wave signal having a second harmonic component only when the stock is out of alignment; means for deriving an error signal from said harmonic component; and means responsive to said error signal for repositioning the stock along said transverse axis, whereby correct transverse alignment is maintained.

12. An alignment-correcting system for maintaining stock moving along a given axis in correct alignment along a transverse axis, comprising: means for scanning a beam of light across an edge of the stock, said edge being one which is effectively parallel to said given axis of movement, said scanning being centered over said edge so that a portion of said scanned light beam is incident on the stock and another portion thereof extends beyond the edge of the stock in equal amounts; means responsive to at least one of said portions of energy for producing therefrom a signal having a predetermined harmonic component only when the stock is out of alignment; means for deriving an error signal from said harmonic component; and means responsive to said error signal for repositioning the stock along said transverse axis, whereby correct transverse alignment is maintained.

References Cited in the file of this patent

UNITED STATES PATENTS

| | | |
|---|---|---|
| 2,489,305 | McLennan | Nov. 29, 1949 |
| 2,792,504 | Slamar et al. | May 14, 1957 |
| 2,964,641 | Selgin | Dec. 13, 1960 |
| 3,041,921 | Pickels et al. | July 3, 1962 |